United States Patent
Belghoul et al.

(10) Patent No.: US 10,862,515 B2
(45) Date of Patent: Dec. 8, 2020

(54) COORDINATION OF COMMUNICATION PROTOCOLS USING A SHARED FRONT-END MODULE

(71) Applicant: Apple Inc., Cupertino, CA (US)

(72) Inventors: Farouk Belghoul, Campbell, CA (US); Tideya Kella, Santa Clara, CA (US); Ehsan Haghani, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/696,076

(22) Filed: Nov. 26, 2019

(65) Prior Publication Data

US 2020/0235761 A1    Jul. 23, 2020

Related U.S. Application Data

(60) Provisional application No. 62/794,453, filed on Jan. 18, 2019.

(51) Int. Cl.
  *H04B 1/00* (2006.01)
  *H04B 1/40* (2015.01)
  *H04B 17/318* (2015.01)

(52) U.S. Cl.
  CPC ......... *H04B 1/0067* (2013.01); *H04B 1/0057* (2013.01); *H04B 1/40* (2013.01); *H04B 17/318* (2015.01)

(58) Field of Classification Search
  CPC ........ H04B 1/00; H04B 1/005; H04B 1/0067; H04B 1/10; H04B 1/40; H04B 17/309; H04B 17/318
  See application file for complete search history.

(56) References Cited

U.S. PATENT DOCUMENTS

| | | | | |
|---|---|---|---|---|
| 7,065,335 B2* | 6/2006 | Ben-Ayun | ............ | H03G 3/3052 455/136 |
| 8,655,299 B2* | 2/2014 | Mirzaei | ................... | H03F 1/083 455/307 |
| 2010/0008338 A1* | 1/2010 | Tsfati | .................... | H04B 1/406 370/338 |
| 2019/0045461 A1 | 2/2019 | Fang et al. | | |

FOREIGN PATENT DOCUMENTS

| | | | | |
|---|---|---|---|---|
| JP | 2003124759 A | * | 4/2003 | ............... H04B 1/16 |
| WO | 2018081472 A1 | | 5/2018 | |
| WO | 2019005038 A1 | | 1/2019 | |

* cited by examiner

*Primary Examiner* — Blane J Jackson
(74) *Attorney, Agent, or Firm* — Fletcher Yoder PC

(57) ABSTRACT

A circuit component may determine whether first signal indicative of at least one of the plurality of communication interface circuits accessing the FEM during a respective communication slot associated with the FEM has been received, determine a first Received Signal Strength Indicator (RSSI) value for the respective communication slot used by the FEM based on data associated with the respective communication slot, and store the first RSSI value in response to the first signal not being received. The circuit component may then determine a first gain for a subsequent slot based on the first RSSI value and discard the first RSSI value in response to the first signal being received.

20 Claims, 9 Drawing Sheets

COORDINATION OF COMMUNICATION PROTOCOLS USING A SHARED FRONT-END MODULE

CROSS-REFERENCE TO RELATED APPLICATIONS

This application claims the benefit of U.S. Provisional Application No. 62/794,453, entitled "Improving Coordination of Communication Protocols using a Shared Front-End Module," filed on Jan. 18, 2019, which is incorporated herein by reference in its entirety for all purposes.

BACKGROUND

The present disclosure relates generally to techniques for facilitating radio frequency (RF) communications, and more particularly, to techniques for facilitating RF communications between different communication protocols using a shared front-end module of an electronic device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Transceivers are commonly included in various electronic devices, and particularly, portable electronic devices such as, for example, phones (e.g., mobile and cellular phones, cordless phones, personal assistance devices), computers (e.g., laptops, tablet computers), internet connectivity routers (e.g., Wi-Fi routers or modems), radios, televisions, or any of various other stationary or handheld devices. Certain types of transceivers, known as wireless transceivers, may be used to generate wireless signals to be transmitted by way of an antenna in the transceiver. Moreover, certain transceivers may facilitate full-duplex communication, allowing for high speed data transmission. That is, for example, a transceiver may concurrently transmit and receive radio-frequency (RF) data signals via an antenna coupled to the transceiver.

As transceivers receive and transmit RF data signals using different protocols and different radio frequency bands, different chipsets of circuit components may be used to facilitate the communication between the communicating devices. Each of the different chipsets may access an antenna of the corresponding electronic device using a front-end module (FEM). To preserve physical space within the electronic device, one FEM may be shared amongst the different chipsets. However, sharing the FEM among different chipsets may reduce the quality of the received signals when access to the FEM is not coordinated between the different chipsets in an effective manner.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As cellular communication protocols continue to develop, provisions to enable electronic devices to use these new generation network node systems (e.g., a fifth-generation new radio (5G NR) standard) are simultaneously being developed. By way of example, the 5G NR standard is now developed to support multiples numerologies and frame structures. For instance, the 5G NR standard supports 15 kHz, 30 kHz, 60 kHz, and 120 kHz numerologies. In addition, the 5G NR standard supports a number of band licensed and unlicensed frequencies ranging from 400 MHz to 60 GHz. Electronic devices that support the 5G NR standard are expected to operate in both sub-6 GHz bands and at slot levels in 3rd Generation Partnership Project (3GPP) procedures. Moreover, these electronic devices are also expected to facilitate a new radio non-standalone operation that allows a parallel operation of Long-Term Evolution (LTE) communication protocols in dual connectivity setup within a 5 GHz band. Further, the 5G NR standard specifies that millimeter wave spectrum (mmWave) communication protocols using beam-based operations should be operable for tasks such as beam acquisition or tracking, while the electronic device performs cellular communication operations.

To facilitate each communication protocol specified by the 5G NR standard, electronic devices include different circuit components (e.g., chipsets, radio frequency integrated circuit (RFICs)) to support different communication protocols (e.g., WiFi, 5G NR, unlicensed bands, ultra-wideband (UWB)). To maintain a desired form factor for electronic devices and to minimize the physical space occupied by circuit components within the electronic devices, each of the different circuit components that support different communication protocols may share a front-end module (FEM) that filters, amplifies, and mixes radio signals received and transmitted via the electronic device. However, by sharing the same FEM, different circuit components that process RF signals differently may not effectively receive or transmit the desired RF signals while the FEM is concurrently being used for different communication protocols.

For instance, in the 5G NR communication protocol, an automated gain control (AGC) tracking loop algorithm may be employed by the respective circuit component that facilitates the 5G NR communication. The AGC tracking loop algorithm may involve using the Received Signal Strength Indicator (RSSI) value of a previous communication slot level to calculate and adjust a gain for the next communication slot for the 5G NR communication. In this way, the gain adjustment is performed gradually based on an immediately preceding communication slot level to establish an optimum (e.g., reduced amount of noise) reception of RF signals from a 5G base station (e.g., gNB).

With the foregoing in mind, when different circuit components that share the same FEM of the respective electronic device receive and transmit data, the FEM may receive and transmit data in an ad hoc manner based on data signals received at various times from other devices, stations, or the like. As such, when certain circuit components access the shared FEM, the respective circuit components may employ different gain change algorithms to facilitate its respective communication. As a result, the RSSI value calculated for the respective communication slot may be based on a gain value that was used for a communication protocol that does not employ the AGC track looping algorithm described above. In this way, the calculated RSSI value for the respective communication slot may be erroneous or may become corrupted. As such, when the FEM is again used to facilitate communication in the 5G NR communication protocol, the erroneous RSSI level for the previous communication slot may be used to determine the gain for the present communication slot. The resulting incorrect gain may reduce the signal quality of the RF signal transmitted via the FEM and a respective antenna of the electronic device. Moreover, the erroneous gain values may continue to be used for each subsequent communication slot and may result an increasingly distorted RF signal being transmitted via the FEM.

To more effectively coordinate the AGC track looping operation described above, while using multiple circuit components to facilitate different communication protocols, in certain embodiments described herein, a processor (e.g., baseband processor) for coordinating the operations of the FEM and the respective electronic device may receive a single-phase multiple initiator (SPMI) indicator from a respective circuit component that shares the FEM when the respective circuit component attempts to access the FEM. The SPMI indicator may be provided by the certain circuit components that do not use the AGC track looping algorithm or employs a respective gain operation for its respective communication protocol. The SPMI indicator may provide a notification to the processor to discard calculated RSSI values that correspond to communication slots in which the SPMI indicator was received. As a result, when the FEM is later accessed by the circuit component that employs the AGC tracking loop algorithm, the processor may use the last stored RSSI value to determine the gain for the respective communication slot. The resulting gain may more accurately adjust the RF signal being transmitted via the FEM, as compared to using the corrupted gain determined using the corrupted RSSI values determined after different gains are applied to the respective communication slot according to the respective communication protocol.

Although the foregoing description of the embodiments for improving the signal quality of the RF signals transmitted via the shared FEM is described with respect to using the AGC tracking loop algorithm, it should be noted that the embodiments described herein may also be employed for automatic frequency correction (AFC) operations applied to RF signals communicated via the shared FEM, channel quality indicator (CQI) reporting operations, channel estimation algorithms, and the like. Additional details with regard to coordinating gain calculation, frequency correction, CQI reporting, and channel estimating using the embodiments presented herein will be discussed below with reference to FIGS. 1-12.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
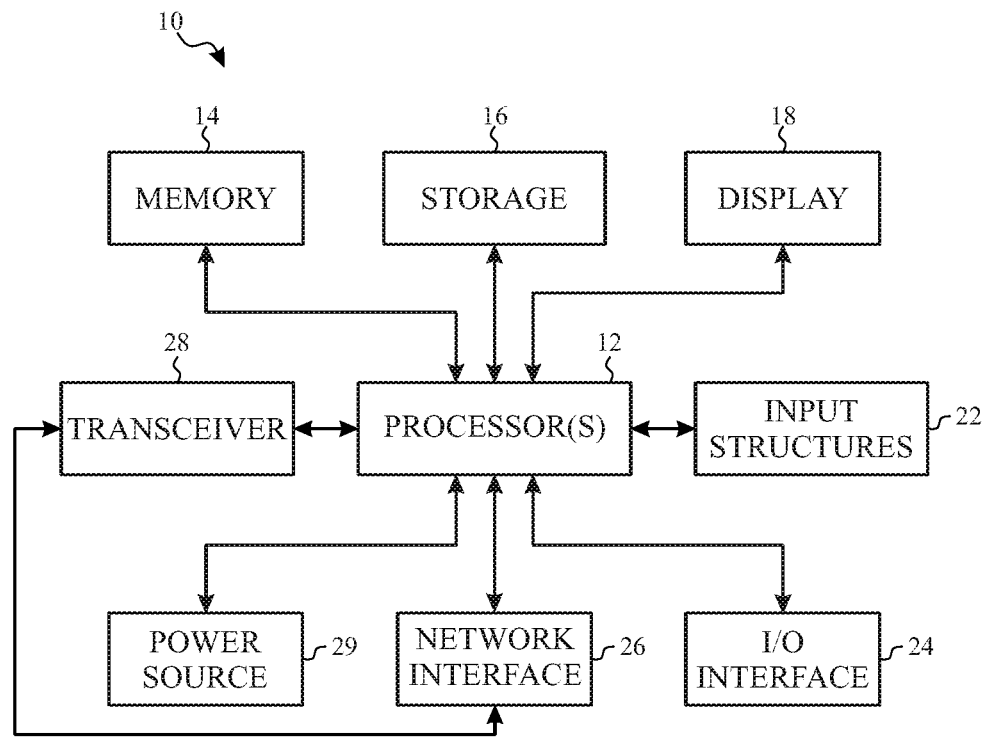
FIG. 1 is a schematic block diagram of an electronic device including a transceiver, in accordance with an embodiment.

With the foregoing in mind, a general description of suitable electronic devices that may employ a transceiver that includes an adaptive power equalizing electrical balance duplexer will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, a transceiver 28, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
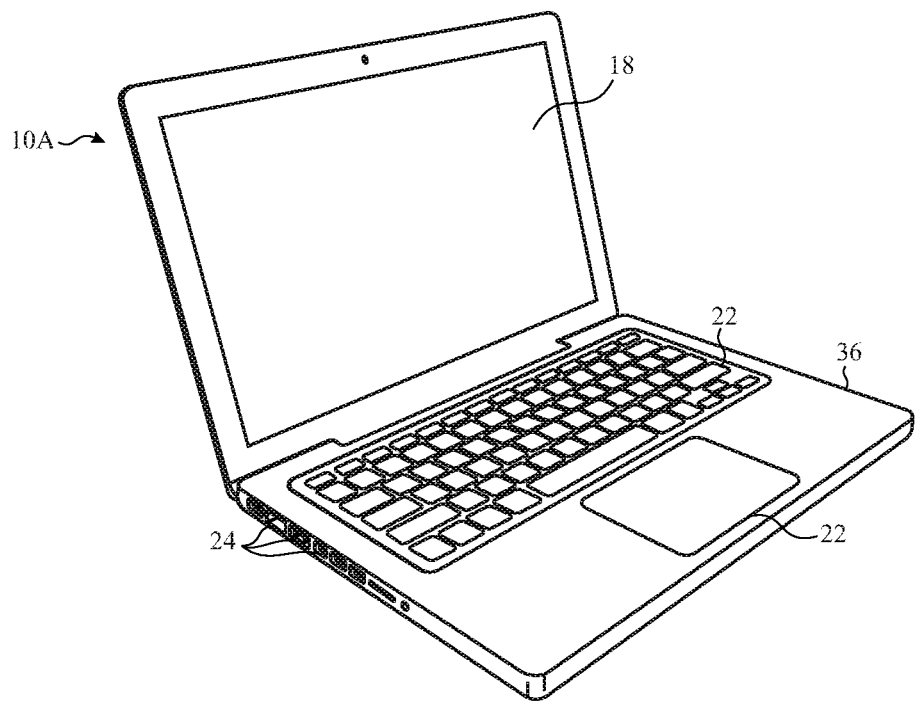
FIG. 2 is a perspective view of a notebook computer representing an embodiment of the electronic device of FIG. 1.
Figure 4:
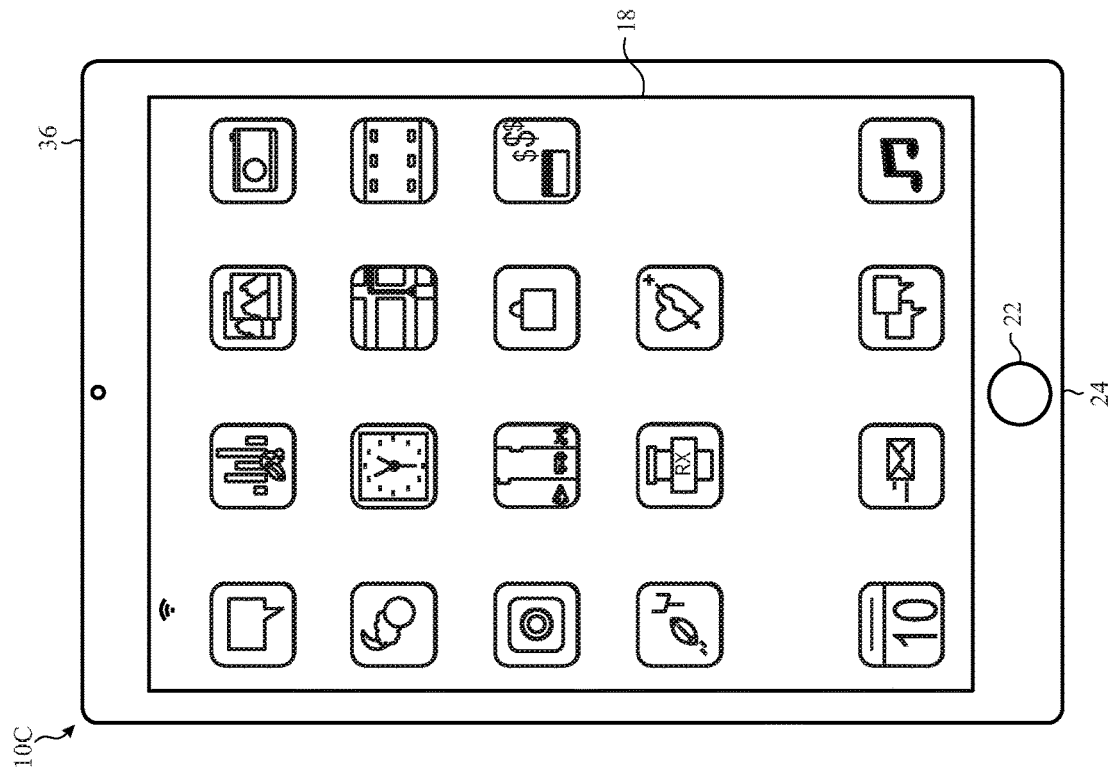
FIG. 4 is a front view of another hand-held device representing another embodiment of the electronic device of FIG. 1.
Figure 3:
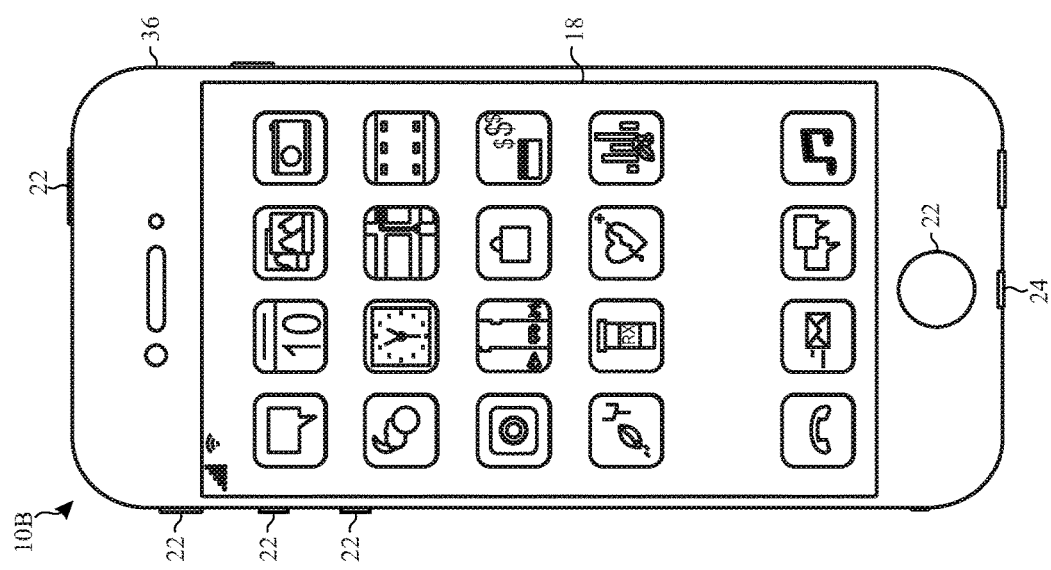
FIG. 3 is a front view of a hand-held device representing another embodiment of the electronic device of FIG. 1.
Figure 5:
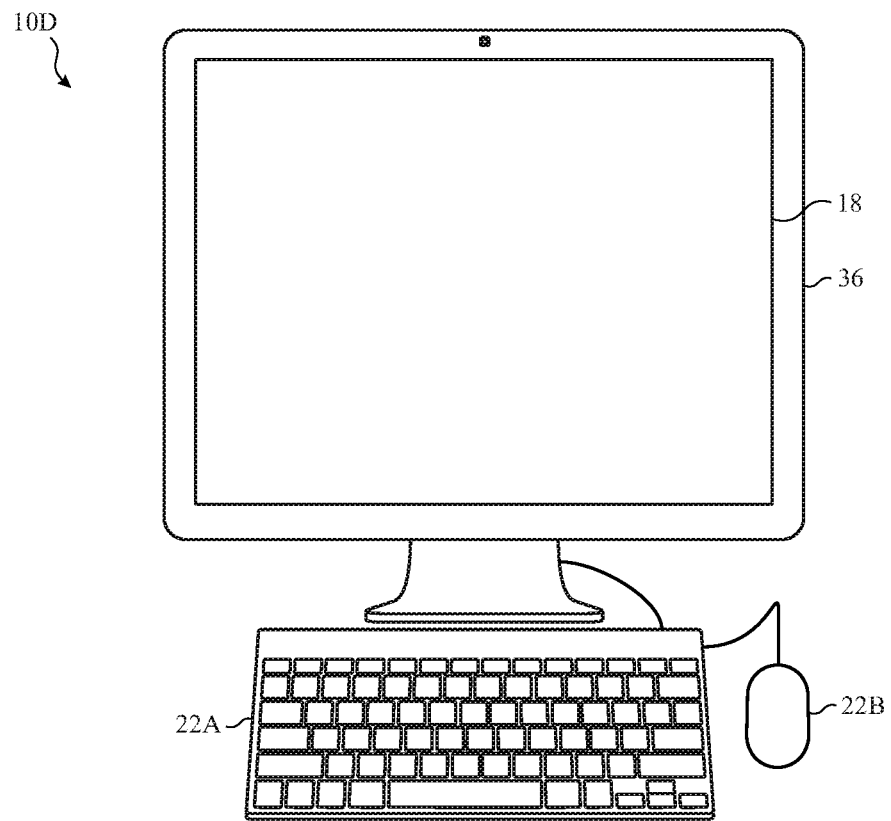
FIG. 5 is a front view of a desktop computer representing another embodiment of the electronic device of FIG. 1.
Figure 6:
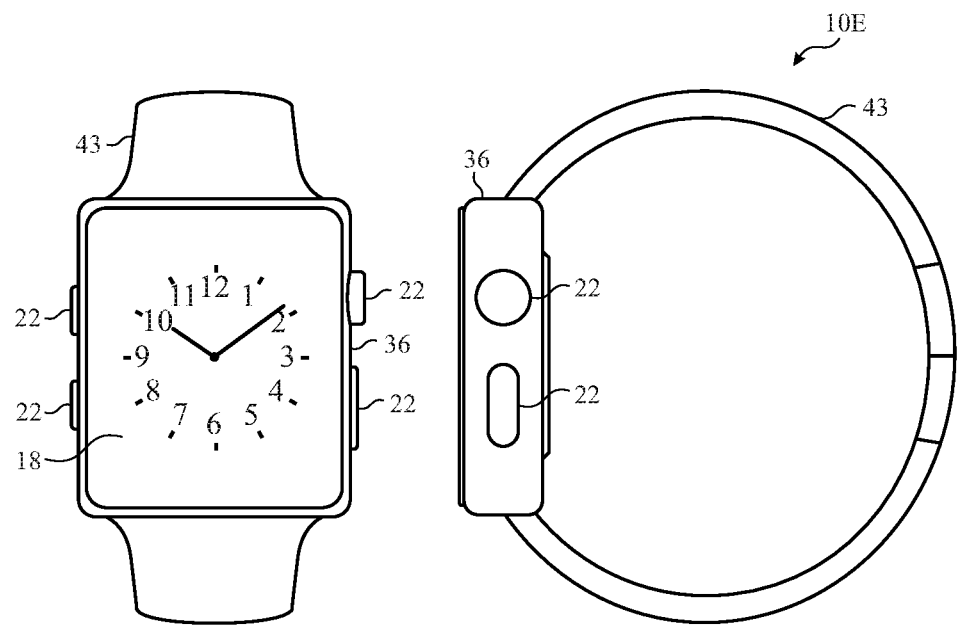
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, $5^{th}$ generation (5G) cellular network, long term evolution (LTE) cellular network, long term evolution enhanced license assisted access (LTE-eLAA) cellular network, or long term evolution advanced (LTE-A) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra Wideband (UWB), alternating current (AC) power lines, and so forth.

In certain embodiments, to allow the electronic device 10 to communicate over the aforementioned wireless networks (e.g., Wi-Fi, WiMAX, mobile WiMAX, 4G, 5G, LTE, and so forth), the electronic device 10 may include a transceiver 28. The transceiver 28 may include any circuitry the may be useful in both wirelessly receiving and wirelessly transmitting signals (e.g., data signals). Indeed, in some embodiments, as will be further appreciated, the transceiver 28 may include a transmitter and a receiver combined into a single unit, or, in other embodiments, the transceiver 28 may include a transmitter separate from the receiver. For example, the transceiver 28 may transmit and receive OFDM signals (e.g., OFDM data symbols) to support data communication in wireless applications such as, for example, PAN networks (e.g., Bluetooth), WLAN networks (e.g., 802.11x Wi-Fi), WAN networks (e.g., 3G, 4G, 5G, and LTE, LTE-eLAA, and LTE-A cellular networks), WiMAX networks, mobile WiMAX networks, ADSL and VDSL networks, DVB-T and DVB-H networks, UWB networks, and so forth. Further, as described below, the transceiver 28 may facilitate bi-directional communication (e.g., full-duplex communication). For instance, in some embodiments the transceiver 28 may be implemented to operate using frequency division duplexing (FDD). That is, for example, the transceiver 28 may synchronously (e.g., concurrently) transmit a transmission signal in a first frequency band and may receive a received signal in a second frequency band different from the first frequency band. As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal serial bus (USB), or other similar connector and protocol.

Input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control or may toggle between vibrate and ring modes. The input structures 22 may also include a microphone that may obtain a user's voice for various voice-related features, and a speaker that may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
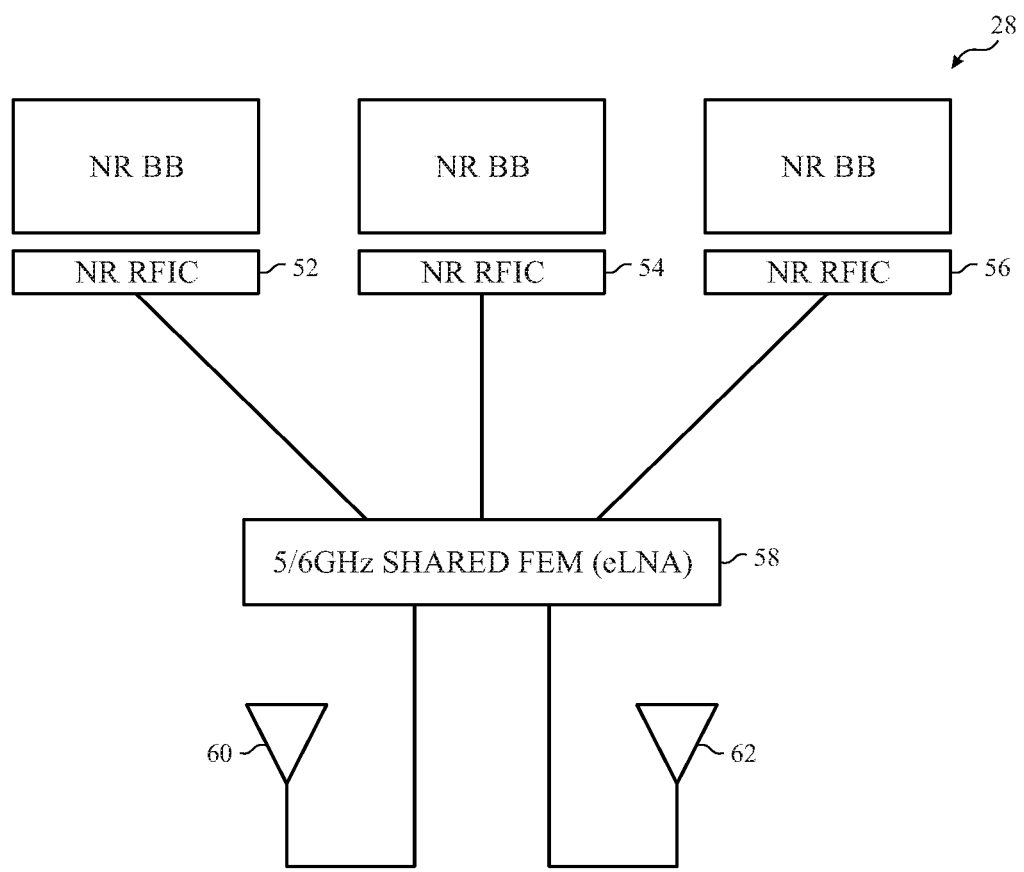
FIG. 7 is a schematic diagram of radio frequency integrated circuits (RFICs) using a shared front-end module (FEM), in accordance with an embodiment.

As previously noted above, each embodiment (e.g., notebook computer 10A, handheld device 10B, handheld device 10C, computer 10D, and wearable electronic device 10E) of the electronic device 10 may include a transceiver 28, which may include a number of circuit components that facilitates communication via a number of different communication protocols. With the foregoing in mind, FIG. 7 depicts example circuit components that may be part of the transceiver 28. By way of example, the transceiver 28 may include a 5G NR radio frequency integrated circuit (RFIC) 52 that facilitates 5G NR communication via a 5G NR baseband (BB), a Wi-Fi RFIC 54 that facilitates Wi-Fi communication via a Wi-Fi BB, and an ultra-wideband (UWB) RFIC 56 that facilitates UWB communication via a UWB BB. Each of the depicted RFICs 52, 54, and 56 may be coupled to a shared front-end module (FEM) 58. The shared FEM 58 may include circuitry that processes signals received from the RFICs 52, 54, and 56 and outputs RF signals that may be transmitted via one or more antennas 60 and 62.

Figure 8:
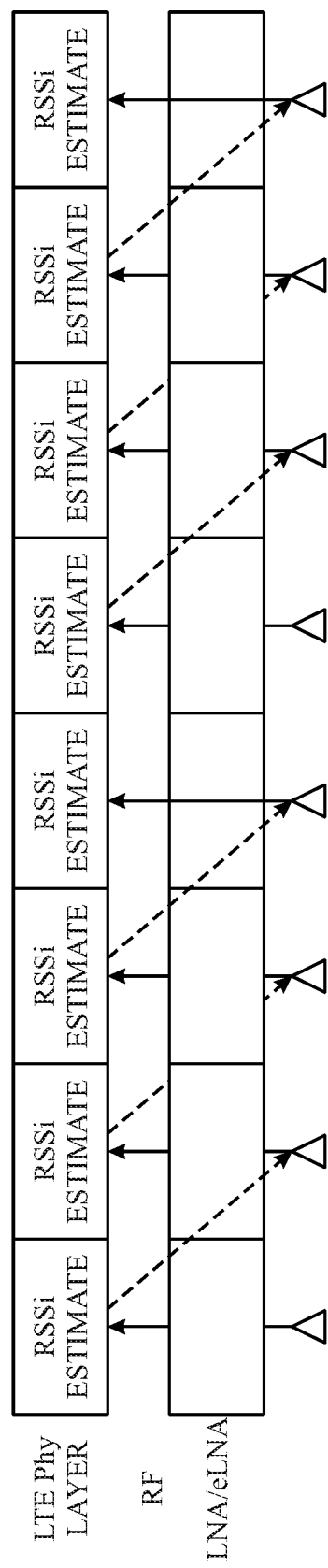
FIG. 8 is communication diagram illustrating an automated gain control (AGC) tracking loop employed for Long-Term Evolution (LTE) per Time Transmission Interval (TTI) communication protocol, in accordance with an embodiment.
Figure 9:
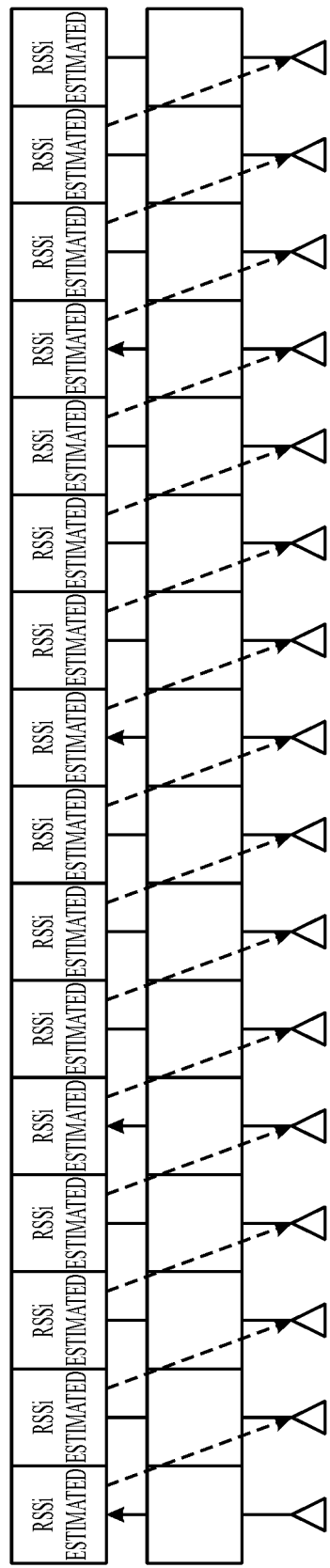
FIG. 9 is communication diagram illustrating an automated gain control (AGC) tracking loop employed for a fifth-generation new radio (5G NR) per slot communication protocol, in accordance with an embodiment.

To enable two or more RFICs to maintain connection to two communication protocols at the same time, the processor 12 may perform two or more noise filtering or gain operations at the same time. For instance, FIGS. 8 and 9 illustrate communication diagrams that illustrate an AGC tracking loop being maintained by the processor 12 for two communication protocols that are performed in parallel. For example, FIG. 8 depicts a AGC loop performed for Long-Term Evolution (LTE) per Time Transmission Interval (TTI), while FIG. 9 depicts an AGC loop that may be performed in parallel for a 5G NR per slot. To perform the operations in parallel, each RFIC 52, 54, 56 may each use an independent FEM to individually transmit a respective RF signal.

As briefly discussed above, the AGC loop (e.g., control tracking loop) may be performed at a slot level to maintain data connection to a respective LTE or NR cell. For example, by way of operation, the AGC loop algorithm involves obtaining the RSSI level of a previous slot to determine and adjust the gain for the next slot. In addition to gain control loop tracking, the processor 12 may use inter-RAN exchange (IRX) samples collected for every slot to perform automated frequency correction (AFC) operations to correct frequency drift in the transmitted or received RF signal and bring the corresponding modulated signal back to the center frequency carrier. The processor 12 may also use the IRX samples for every slot to perform a channel estimation, which may be done for both control and data channels to collect samples and demodulation reference signal (DMRS) symbols to estimate the quality of the channel and the interference levels.

In any case, data (e.g., RSSI, DMRS symbol) obtained using a previous slot may be used to adjust the gain used for a low-noise amplifier (LNA), as shown in FIG. 9. As a result, the RF signal transmitted via the antenna 60 may more accurately represent the data contained therein.

Figure 10:
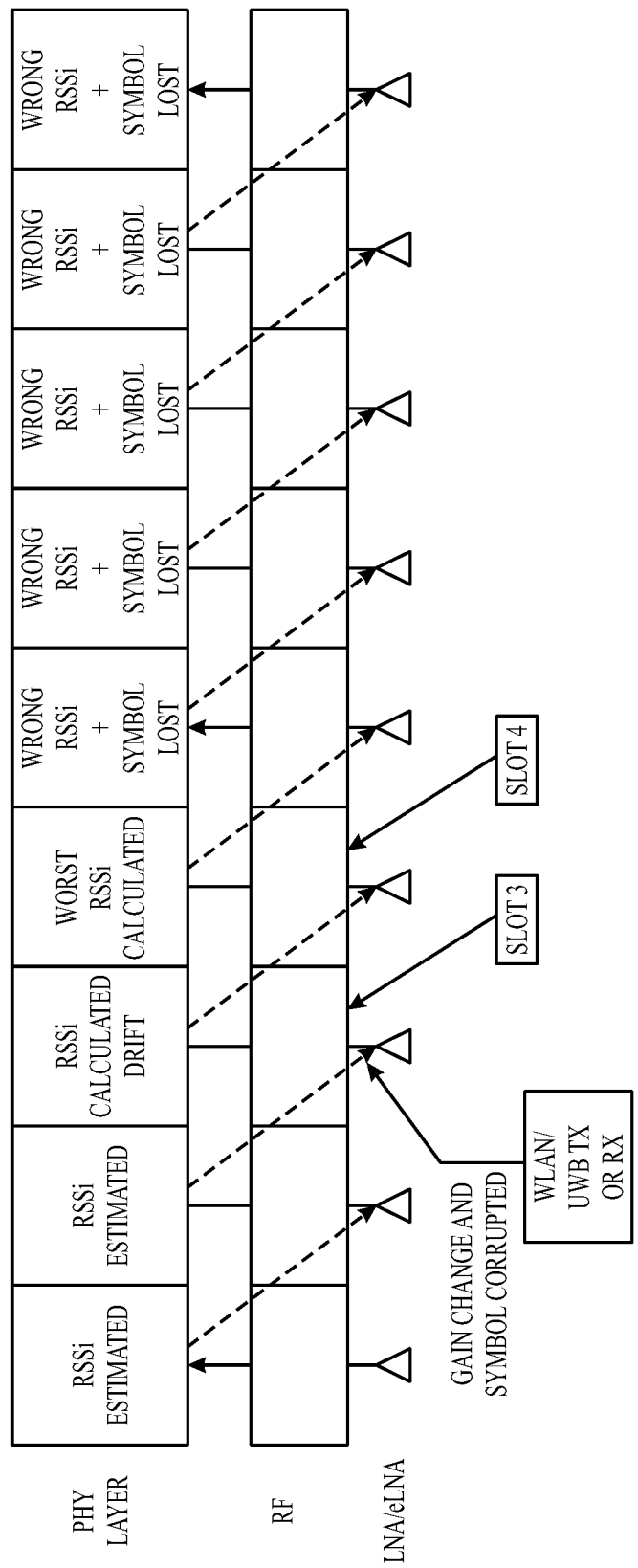
FIG. 10 is communication diagram illustrating an automated gain control (AGC) tracking loop employed for a fifth-generation new radio (5G NR) per New Radio (NR) slot communication protocol when 5G NR RFICs and other RFICs are accessing the communication slots, in accordance with an embodiment.

Keeping the foregoing in mind, when different RFICs share the same FEM 58, the processor 12 may not coordinate access to the FEM 58 in a controlled manner. That is, the RFICs may transmit or receive RF signals at various times that may be unpredictable due to other devices sending or generating the respective RF signals. When two or more RFICs (e.g., NR RFIC 52 and Wi-Fi RFIC 54 and/or RFIC 56) access the shared FEM 58 for transmission or reception of RF signals, different processing operations may be undertaken to receive or transmit the respective RF signals. For example, when the NR RFIC 52 is receiving data in the 5 GHz band and the Wi-Fi RFIC 54 and/or the UWB RFIC 56 accesses the shared FEM 58 for transmitting or receiving RF signals, the Wi-Fi RFIC 54 and/or the UWB RFIC 56 may apply certain gains for their respective RF signals that may cause the calculated RSSI value to become erroneous. When the NR RFIC 52 resumes access to the shared FEM 58, the previously calculated RSSI value for the previous slot may be incorrect and yet the NR RFIC 52 may still use the erroneous RSSI value to determine a gain for the present slot. In the same manner, phase shifts and gain jumps generated based on the use of the shared FEM 58 by the Wi-Fi RFIC 54 and/or the UWB RFIC 56 may lead to corrupted symbols and random RSSI values being populated for the corresponding slots in which the Wi-Fi RFIC 54 and/or the UWB RFIC 56 used the shared FEM 58. As a result, the erroneous RSSI value or corrupted symbols may continue to be propagated throughout the subsequent slots that eventually may lead to a full break of the AGC loop and complete distortion of the RF signal received or transmitted by the shared FEM 58. By way of example, FIG. 10 illustrates how the incorrect gain adjustment is propagated throughout the slots after the Wi-Fi RFIC 54 and/or the UWB RFIC 56 accesses the shared FEM 58 to transmit or receive RF signals during the third slot depicted in FIG. 10. As shown in FIG. 10, due to the Wi-Fi RFIC 54 and/or the UWB RFIC 56 access of the shared FEM 58 during slot 3, the calculated RSSI value drifts from an accurate value. The drifted RSSI value is then used to generate an incorrect gain adjustment for the LNA associated with slot 4. The incorrect gain adjustment is then propagated throughout the remaining slots because the RSSI value for each slot from slot 3 is based on the erroneous RSSI value for slot 3. As the AGC loop algorithm continues to diverge for each subsequent slot, the 5G NR connection may be lost.

In addition to the erroneous AGC loop algorithm being performed, the CQI or IRX symbols also become lost due to the drifted RSSI value. That is, for some communication protocols, the processor 12 may engage the AGC loop algorithm using the CQI or IRX symbols associated with a previous slot to adjust the frequency or phase for the subsequent slot. Like the erroneous gain propagated throughout the slots, the frequency adjustment performed for each subsequent slot that is determined based on a corrupted symbol may be propagated throughout the remaining slots. In this way, if the FEM 58 is accessed multiple times for multiple consecutive Wi-Fi or UWB transmissions, the automatic frequency correction (AFC) will fail and lead to a loss of connection. In the same manner, the CQI and channel estimation may also be distorted due to the corrupted symbols obtained when certain communication protocols are being implemented by the FEM 58.

To better enable the NR RFIC 52 to share access to the FEM 58 with the Wi-Fi RFIC 54 and/or the UWB RFIC 56, a circuit component (e.g., processor 12, NR RFIC 52, baseband processor) may perform an adapted AGC loop algorithm, an adapted AFC loop algorithm, or the like while the shared FEM 58 is used by different RFICs. For the purposes of discussion, the following description for performing the adapted AGC loop algorithm in a communication operation will be described as being performed by the processor 12. However, it should be noted that the operations described herein may be performed by any suitable circuit component such as the processor 12, the NR RFIC 52, the FEM 58, a baseband processor, or the like.

In one embodiment, a single-phase multiple initiator (SPMI) bus between the baseband of the Wi-Fi BB, the UWB BB, and the NR BB may be used to send single-phase multiple initiator (SPMI) indicator from the Wi-Fi RVIC 54 and/or the UWB RFIC 56 to the processor 12 when the respective RFIC accesses the shared FEM 58. In the absence of receiving the SPMI indicator, the processor 12 may store every RSSI value for each communication slot in which the NR RFIC 52 accesses the FEM 58. As such, the processor 12 may preserve RSSI values that have not been altered or corrupted by gain operations associated with other communication protocols (e.g., Wi-Fi, UWB).

On the other hand, if the processor 12 receives the SPMI indicator during a slot, the processor 12 may discard the corresponding RSSI value calculated for the respective slot and forgo calculating a gain value for the subsequent slot according to the AGC loop algorithm. When the processor 12 later does not receive the SPMI indicator for a subsequent slot, the processor 12 may use the last stored RSSI value as a backup value to calculate the gain for the present slot using the AGC loop algorithm. In this way, the RSSI value may not drift or become corrupted in a significant amount to cause the communication link to be lost. Moreover, the processor 12 may continue to store the valid RSSI values and propagate valid RSSI values for the AGC loop algorithm.

Figure 11:
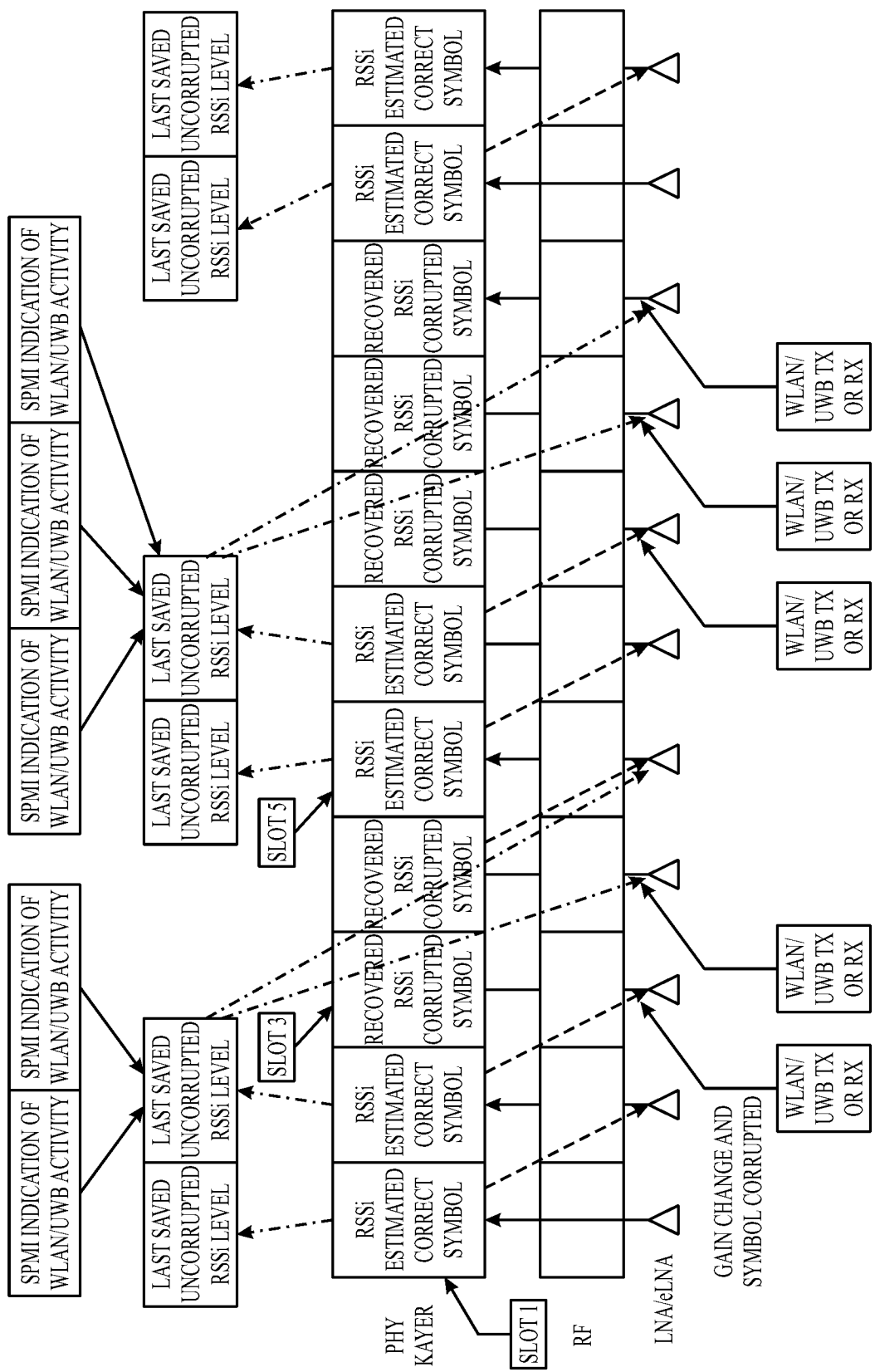
FIG. 11 is another communication diagram illustrating an automated gain control (AGC) tracking loop employed for a fifth-generation new radio (5G NR) per New Radio (NR) slot communication protocol when 5G NR RFICs and other RFICs are accessing the communication slots, in accordance with an embodiment.

By way of example, FIG. 11 illustrates an example communication slot diagram that illustrates how the processor 12 may halt the operation of the AGC loop algorithm when the Wi-Fi RVIC 54 and/or the UWB RFIC 56 send the SPMI indicator. Referring to FIG. 11, at slot 1, the processor 12 may estimate the RSSI value for the respective slot and save the RSSI value in a memory or storage component. However, at slot 3, the processor 12 may receive the SPMI indication representative of Wi-Fi or UWB activity. Since the processor 12 receives the SPMI indicator, the processor 12 may not save or calculate the RSSI value for the respective slot. As such, the drifted RSSI value may not be saved or used at a later time in the AGC loop algorithm. At slot 5, the SPMI indicator may not be received by the processor 12. As such, the processor 12 may retrieve the last saved RSSI value for slot 3 to calculate the gain for slot 5. In addition, the processor 12 may calculate the RSSI value for the respective slot and again store the calculated RSSI value. By saving the last valid RSSI value and not calculating the RSSI value when the SPMI indicator is received, the processor 12 may ensure that the gain calculated for the 5G NR communication slots is properly calculated and applied to the LNA.

With the foregoing in mind, it should be noted that the same process described above with respect to FIG. 11 may be performed when the processor 12 or other suitable component performed the AFC algorithm to correct for phase shifts and frequency adjustments. That is, the processor 12 may discard corrupted IRX symbols, CQI symbols, and other symbols calculated for slots when the SPMI indicators are received. The processor 12 may then resume the AFC loop algorithm to correct for frequency drifts and phase shifts using the previously stored RSSI values, the uncorrupted IRX symbols, the uncorrupted CQI symbols, and the like, which were stored for the slots that the SPMI indicators were not received.

In some embodiments, instead of just using the last stored RSSI value, IRX symbol, or CQI symbol, the processor 12 may analyze a number of the last stored values to determine a value to use for the slot after the SPMI indicator is not received. That is, the processor 12, for example, may determine an average value, a predicted value, or the like to use for the AGC loop algorithm, the AFC loop algorithm, or both to use instead of just using the last stored value.

In addition to employing the methods described herein for AGC loop algorithms and AFC loop algorithms, the present embodiments may also be employed for channel estimation and CQI reporting improvements. In some embodiments, the processor 12 or the like may perform CQI reporting and channel estimation algorithms and send the results to a communicatively coupled device, such as a 5G base station (e.g., gNB). In the same manner described above for the adjusted AGC loop algorithm and the AFC loop algorithm, the processor 12 or other suitable component may receive the SPMI indicator when the Wi-Fi RVIC 54 and/or the UWB RFIC 56 accesses the FEM 58. The processor 12 may then discard samples from being used in the CQI reporting algorithm or the channel estimation algorithm in response to the SPMI indicator being received for a particular slot. Indeed, the processor 12 may send the CQI report and channel estimation report to the communicatively coupled device based on the values calculated when the SPMI indicator is not received. The CQI report may be calculated based on a collection of values determined when the SPMI indicator is not received. In some embodiments, the CQI reporting and the channel estimation reports may be performed at regular time intervals, as opposed to per slot. It should be noted, however, by employing the techniques described herein the CQI and channel reports sent to the communicatively coupled device or network is limited to valid or CQI values or channel estimates. In turn, the communicatively coupled device avoids processing incorrect or corrupted CQI values or channel estimates, thereby freeing resources of the communicatively coupled device to perform other operations. In addition, when the SPMI indicator is received for a number of consecutive slots, the communication connection between the FEM 58 and the communicatively coupled device may be disconnected to preserve power for both communicating device until the SPMI indicator is no longer received.

Figure 12:
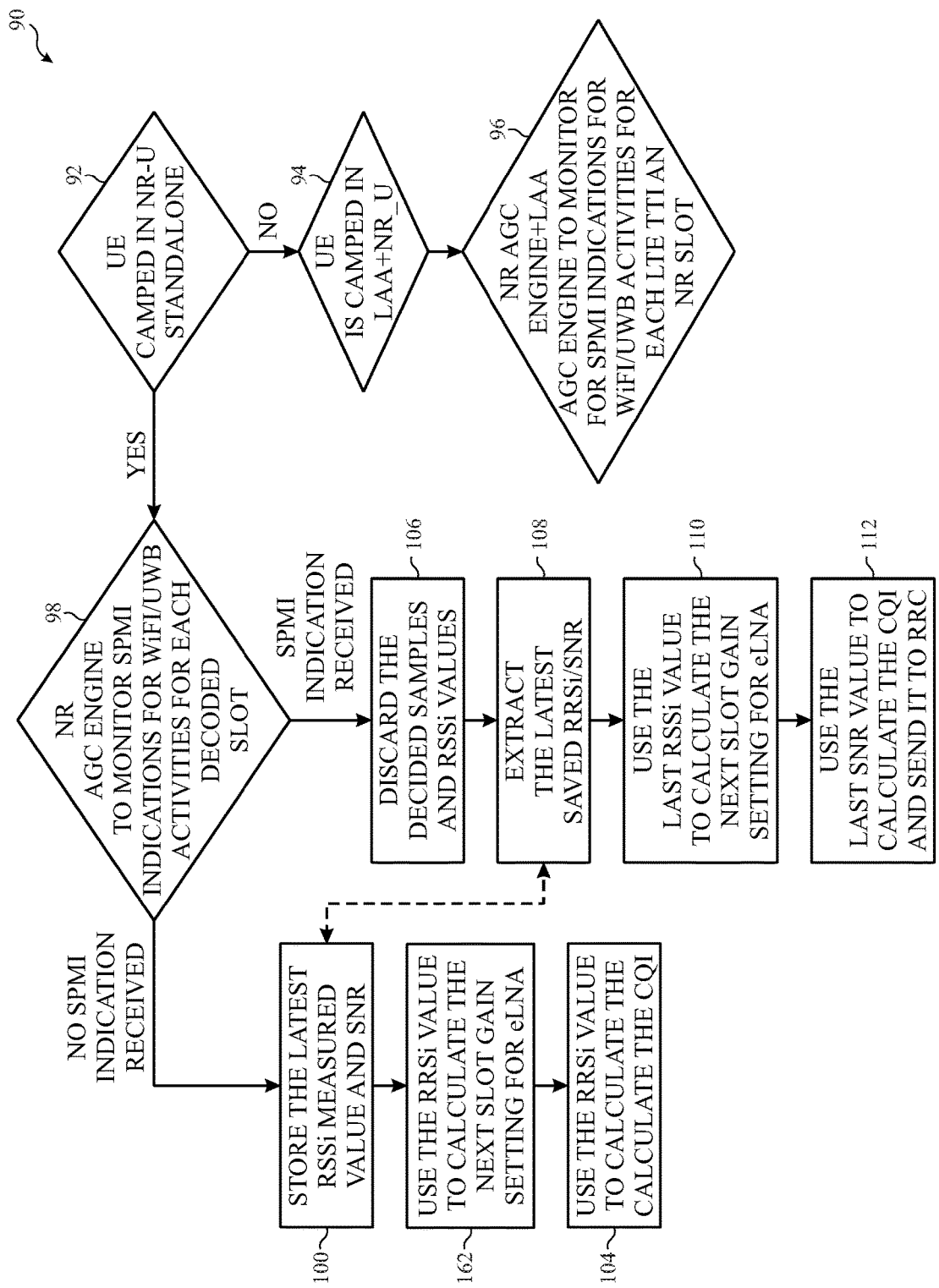
FIG. 12 is a flow chart of a method for coordinating the calculations of gain and channel quality indicators via a FEM that is shared among different RFICs employing different communication protocols, in accordance with an embodiment.

With the foregoing in mind, FIG. 12 illustrates a flow chart of a method 90 for coordinating the calculations of gain and channel quality indicators via a FEM that is shared among different RFICs employing different communication protocols. For the purposes of discussion, the following description of the method 90 will be described as being performed by the processor 12, but it should be noted that the method 90 may be performed by any suitable circuit component. In addition, although the following description of the method 90 is described in a particular order, it should be noted that the method 90 may be performed in any suitable order.

Referring now to FIG. 12, at block 92, the processor 12 may determine whether the electronic device 10 (e.g., user equipment (UE)) is camped or operating in a New Radio-unlicensed (NR-U) standalone mode, which corresponds to operating in an unlicensed band. If the electronic device 10 is not in the NR-U standalone mode, the processor 12 may proceed to block 94 and determine whether the electronic device is camped in the License Assisted Access (LAA) or the NR-U mode. It should be noted that if the electronic device 10 is camped in NR-U only, the processor 12 may maintain the AGC/AFC loop algorithms for NR only. If not the electronic device 10 may maintain both LTE and NR communication, and the processor 12 may separate the AGC loops and the AFC loops. The NR is at slot level while LTE is at frame level.

At block 96, a NR AGC loop algorithm engine (e.g., implemented by the processor 12 or other suitable component) and an LAA AGC loop algorithm engine may monitor for SPMI indicators for each LTE, TII, and NR slot. The processor 12 may then perform similar operations as described below for blocks 100-112.

Referring back to block 92, if the electronic device 10 is in the NR-U standalone mode, the processor 12 may proceed to block 98 and monitor for SPMI indicators for each decoded slot as described above. If, at block 98, the processor 12 does not receive the SPMI indicator, the processor 12 may proceed to block 100 and store the latest RSSI value and the signal-to-noise (SNR) for the respective slot in a memory or storage component.

At block 102, the processor 12 may use the latest RSSI value to calculate a gain setting for LNA associated with the next slot. The processor 12 may then, at block 104, use the RSSI value to calculate the CQI symbol, which may also be stored.

Referring back to block 98, if the processor 12 does receive the SPMI indicator, the processor 12 may proceed to block 106 and discard the latest RSSI value and other samples received for the respective slot. Instead, at block 108, the processor 12 may extract the last stored RSSI value or SNR value stored at block 110. The processor 12 may then use the last stored RSSI value to calculate the next slot gain setting for the LNA. In addition, the processor 12, at block 112, may use the last stored SNR value to calculate the CQI and send it to a communicatively coupled device, such as a radio resource control (RRC) node.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:
1. A system, comprising:
 a front-end module (FEM) configured to transmit and receive a plurality of signals via one or more antennas;
 a plurality of communication interface circuits, wherein each communication interface circuit is configured to process a portion of the plurality of signals according to a respective communication protocol, and wherein each communication interface circuit is configured to share access to the FEM;
a circuit component configured to:
determine whether a first signal indicative of at least one of the plurality of communication interface circuits accessing the FEM during a respective communication slot associated with the FEM is received;
determine a first Received Signal Strength Indicator (RSSI) value for the respective communication slot used by the FEM based on data associated with the respective communication slot in response to the first signal not being received;
determine a first gain for a subsequent communication slot following the respective communication slot based on the first RSSI value; and
store the first RSSI value in a storage component.

2. The system of claim 1, wherein the circuit component is configured to determine a second gain for the subsequent communication slot following the respective communication slot in response to the first signal being received, wherein the second gain is determined based on a second RSSI value associated with a previous communication slot received prior to the respective communication slot.

3. The system of claim 1, wherein the circuit component comprises a baseband processor.

4. The system of claim 1, wherein the at least one of the plurality of communication interface circuits comprises a Wi-Fi radio frequency integrated circuit, an ultra-wideband radio frequency integrated circuit, or both.

5. The system of claim 4, wherein the first signal is received from the Wi-Fi radio frequency integrated circuit, the ultra-wideband radio frequency integrated circuit, or both.

6. The system of claim 1, wherein the circuit component is configured to:
determine an inter-RAN exchange (IRX) symbol and a channel quality indicator (CQI) symbol for the respective communication slot used by the FEM based on the data associated with the respective communication slot in response to the first signal not being received;
determine a frequency drift correction and a phase shift correction for the subsequent communication slot following the respective communication slot based on the inter-RAN exchange (IRX) symbol and the channel quality indicator (CQI) symbol; and
store the inter-RAN exchange (IRX) symbol and the channel quality indicator (CQI) symbol in the storage component.

7. The system of claim 1, wherein the circuit component is configured to determine a second frequency drift correction and a second phase shift correction for the subsequent communication slot following the respective communication slot based on a second inter-RAN exchange (IRX) symbol and a second channel quality indicator (CQI) symbol in response to the first signal being received, wherein the second inter-RAN exchange (IRX) symbol and the second channel quality indicator (CQI) symbol are associated with a previous communication slot received prior to the respective communication slot.

8. A method, comprising:
determining, via a processor, whether a first signal indicative of at least one of a plurality of communication interface circuits accessing a front-end module (FEM) during a respective communication slot associated with the FEM is received, wherein the FEM is configured to transmit and receive a plurality of signals via one or more antennas, wherein each of the plurality of communication interface circuits is configured to process a portion of the plurality of signals according to a respective communication protocol, and wherein each communication interface circuit is configured to share access to the FEM;
determining, via the processor, a first Received Signal Strength Indicator (RSSI) value for the respective communication slot used by the FEM based on data associated with the respective communication slot in response to the first signal not being received;
determining, via the processor, a first gain for a subsequent communication slot following the respective communication slot based on the first RSSI value; and
storing, via the processor, the first RSSI value in a storage component.

9. The method of claim 8, comprising determining, via the processor, a second gain for the subsequent communication slot following the respective communication slot in response to the first signal being received, wherein the second gain is determined based on a second RSSI value associated with a previous communication slot received prior to the respective communication slot.

10. The method of claim 8, comprising discarding a second RSSI value for the respective communication slot used by the FEM based on the data associated with the respective communication slot in response to the first signal being received.

11. The method of claim 8, wherein the first signal comprises a single-phase multiple initiator (SPMI) indicator signal.

12. The method of claim 8, wherein the at least one of the plurality of communication interface circuits comprises a Wi-Fi radio frequency integrated circuit, an ultra-wideband radio frequency integrated circuit, or both.

13. The method of claim 8, comprising:
determining, via the processor, an inter-RAN exchange (IRX) symbol and a channel quality indicator (CQI) symbol associated with the respective communication slot used by the FEM based on the data associated with the respective communication slot in response to the first signal not being received;
determining, via the processor, a frequency drift correction and a phase shift correction for the subsequent communication slot following the respective communication slot based on the inter-RAN exchange (IRX) symbol and the channel quality indicator (CQI) symbol; and
storing, via the processor, the inter-RAN exchange (IRX) symbol and the channel quality indicator (CQI) symbol in the storage component.

14. The method of claim 13, comprising determining an additional frequency drift correction and an additional phase shift correction for an additional subsequent communication slot following the subsequent communication slot based on the inter-RAN exchange (IRX) symbol and the channel quality indicator (CQI) symbol.

15. A non-transitory computer-readable medium comprising computer-executable instructions that, when executed by a processor, are configured to cause the processor to:
determine whether a first signal indicative of at least one of a plurality of communication interface circuits accessing a front-end module (FEM) during a respective communication slot associated with the FEM is received, wherein the FEM is configured to transmit and receive a plurality of signals via one or more antennas, wherein each of the plurality of communication interface circuits is configured to process a portion of the plurality of signals according to a respective communication protocol, and wherein each communication interface circuit is configured to share access to the FEM;

determine a first Received Signal Strength Indicator (RSSI) value for the respective communication slot used by the FEM based on data associated with the respective communication slot in response to the first signal not being received;

determine a first gain for a subsequent communication slot following the respective communication slot based on the first RSSI value; and store the first RSSI value in a storage component.

16. The non-transitory computer-readable medium of claim 15, wherein the computer-executable instructions are configured to cause the processor to determine a second gain for the subsequent communication slot following the respective communication slot in response to the first signal being received, wherein the second gain is determined based on a second RSSI value associated with a previous communication slot received prior to the respective communication slot.

17. The non-transitory computer-readable medium of claim 16, wherein the second RSSI value corresponds to an average RSSI value associated with a plurality of communication slots preceding the respective communication slot.

18. The non-transitory computer-readable medium of claim 16, wherein the second RSSI value corresponds to a predicted RSSI value associated with the respective communication slot.

19. The non-transitory computer-readable medium of claim 15, wherein the computer-executable instructions are configured to cause the processor to:

determine an inter-RAN exchange (IRX) symbol or a channel quality indicator (CQI) symbol associated with the respective communication slot used by the FEM based on the data associated with the respective communication slot in response to the first signal not being received;

determine, via the processor, a frequency drift correction and a phase shift correction for the subsequent communication slot following the respective communication slot based on the inter-RAN exchange (IRX) symbol or the channel quality indicator (CQI) symbol; and store, via the processor, the inter-RAN exchange (IRX) symbol or the channel quality indicator (CQI) symbol in the storage component.

20. The non-transitory computer-readable medium of claim 19, wherein the computer-executable instructions are configured to cause the processor to determine an additional frequency drift correction and an additional phase shift correction for an additional subsequent communication slot following the subsequent communication slot based on the inter-RAN exchange (IRX) symbol or the channel quality indicator (CQI) symbol.

* * * * *